United States Patent [19]
Shimada

[11] Patent Number: 5,444,576
[45] Date of Patent: Aug. 22, 1995

[54] COOLED REFLECTIVE MIRROR APPARATUS

[75] Inventor: Mizuho Shimada, Kanagawa, Japan

[73] Assignee: Equestrian Co., Ltd., Tokyo, Japan

[21] Appl. No.: 97,184

[22] Filed: Jul. 27, 1993

[51] Int. Cl.⁶ .......................... G02B 5/10; G02B 7/195
[52] U.S. Cl. ..................... 359/845; 362/345; 362/346; 362/373
[58] Field of Search ............ 359/845, 851, 852; 362/345, 346, 373; 372/34, 35, 36, 70, 72

[56] References Cited

U.S. PATENT DOCUMENTS

| | | | |
|---|---|---|---|
| 3,482,185 | 12/1969 | Smith et al. | 372/34 |
| 3,966,308 | 6/1976 | Nilson | 359/845 |
| 4,096,450 | 6/1978 | Hill et al. | 372/34 |
| 5,147,130 | 9/1992 | Watanuki | 362/218 |
| 5,150,253 | 9/1992 | Watanuki | 359/845 |
| 5,321,595 | 6/1994 | Jacobi et al. | 362/345 |

Primary Examiner—F. L. Evans
Attorney, Agent, or Firm—Lowe, Price, LeBlanc & Becker

[57] ABSTRACT

A cooled reflective mirror apparatus is provided, in which a reflective mirror body is so constructed as to make the cooling fluid spread in a plane covering the outer wall surface of the reflective mirror body to improve the cooling effect and in which the thickness of the reflective mirror body is made large enough to prevent excess heat from the inner side of the body from reaching the outer wall surface thereby minimizing the temperature rise in the cooling liquid to permit long hours of cooling. The curved inner surface portion is plated to form a reflection mirror surface. The cooling tank is placed in contact with the outer side of the reflective mirror body through the matching flat surface portions of the mirror body and the cooling tank. The cooling tank is fitted with cooling liquid supply and discharge pipes so that the cooling liquid supplied temporarily stays in and circulates through the tank to absorb heat from the outer surface of the reflective mirror body.

5 Claims, 5 Drawing Sheets

F I G. 4
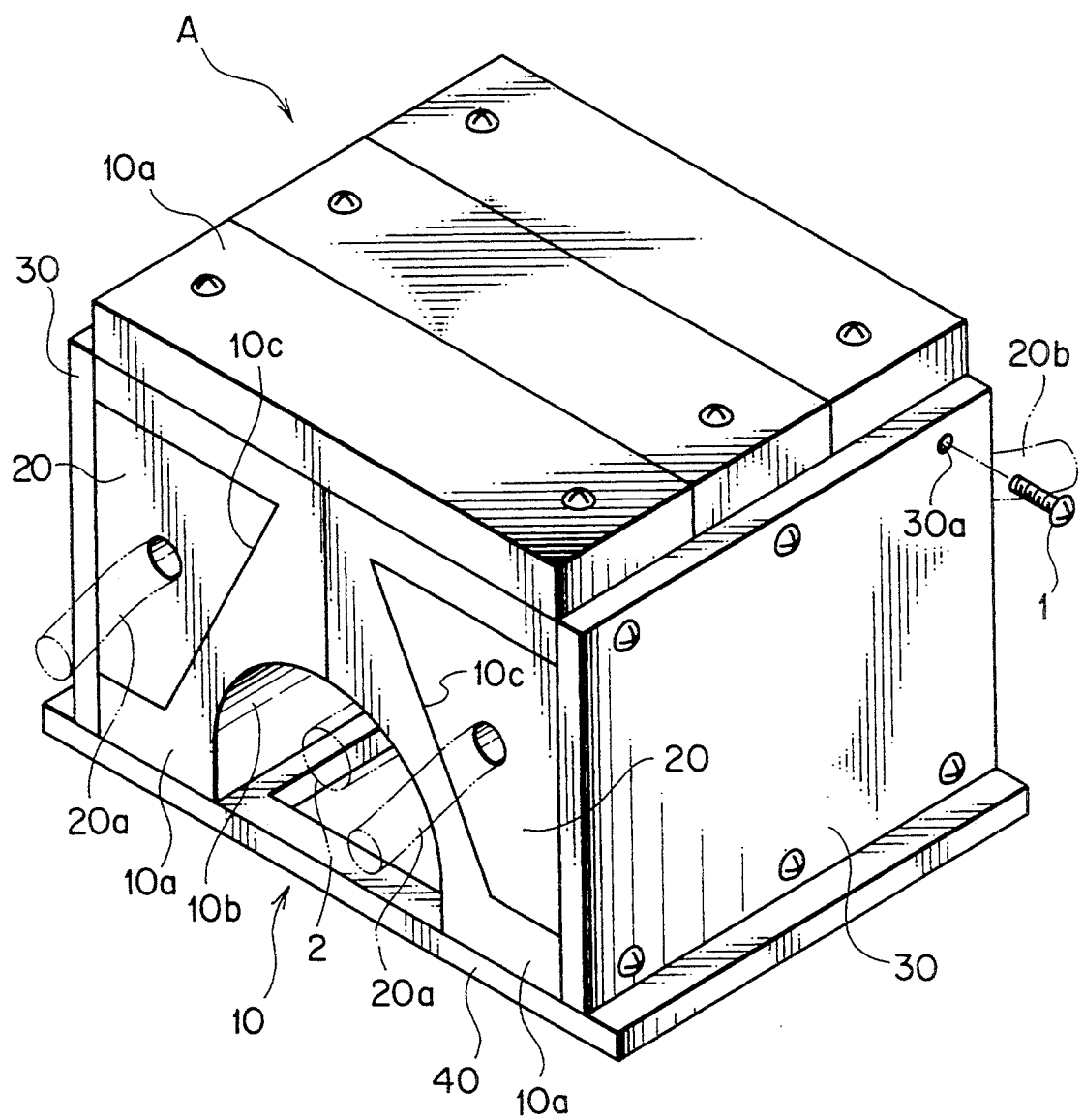

5,444,576

COOLED REFLECTIVE MIRROR APPARATUS

BACKGROUND OF THE INVENTION

1. Field of the Invention

The present invention relates to a cooled reflective mirror apparatus which protects the reflection mirror from being overheated by the heat of a light source used in the reflection mirror. This type of reflection mirror apparatus employs a light source and is installed, for example, in an exposure device for printed circuit boards.

2. Description of the Prior Art

The light source of the exposure device uses a mercury lamp, which heats to high temperatures. Some light sources have their reflection mirror surfaces coated black to absorb the heat radiated from the lamp.

There are prior arts that are related to such an apparatus. Among them are U.S. Pat. No. 5,147,130 entitled "Cooling Liquid Recirculation System for Light Source Unit" and U.S. Pat. No. 5,150,253 entitled "Reflective Mirror Having Cooling Unit Attached."

The cooling structure of the prior art has heat dissipating fins formed at the back of the reflection mirror body and pipes installed between the fins for circulating cooling fluid. Overheating is suppressed by passing coolant through the piping and sending air from outside against the fins.

Such a cooling system has a cooling pipe for circulating the cooling fluid installed zigzag at the back of the reflective mirror facing the light source, at the back of a flat cold mirror, at the back of a curved cold mirror and also at the back of a light-transmitting mirror.

The cooling pipe is secured by a pipe holder, whose bottom surface is bonded with a silicon rubber of heat resisting elastic material and is fixed to a mounting member, thus forming a heat sink.

The outer surface of the cooling pipe in the heat sink is pressed against the back of the reflective mirror that transmits heat of infrared rays and the back of the cold mirror that reflects only ultraviolet rays. In this condition the cooling fluid is circulated through the cooling pipe.

Poor cooling capability of the pipe that passes the cooling liquid may result in deteriorated reflective mirror film over a long period of use. Also, air used for cooling may contaminate the printed circuit cards or films during the exposure process.

SUMMARY OF THE INVENTION

It is therefore an object of this invention to provide a cooled reflective mirror apparatus whose reflective mirror body is so constructed as to make the cooling fluid spread in a plane covering the outer wall surface of the reflective mirror body to improve the cooling effect.

Another objective of the invention is to provide a cooled reflective mirror apparatus in which the reflective mirror body is made thick enough so that excess heat from the inside of the mirror body is progressively dissipated on the way before it reaches the outer wall surface of the body.

A further objective of the invention is to provide a cooled reflective mirror apparatus in which the cooling fluid is prevented from rising in temperature to permit many hours of cooling.

A further objective of the invention is to provide a cooled reflective mirror apparatus in which the cooling pipe through which the cooling fluid is circulated is not laid in a zigzag-like winding arrangement.

A further objective of the invention is to make excess heat of the reflective mirror less likely to be transmitted to the cooling pipe.

A further objective of the invention is to simplify the structure and thereby facilitate the assembly.

BRIEF DESCRIPTION OF THE DRAWINGS

FIG. 4 is a perspective view of a cooled reflective mirror apparatus as a fourth embodiment of the present invention;

DETAILED DESCRIPTION OF PREFERRED EMBODIMENT

Figure 1:
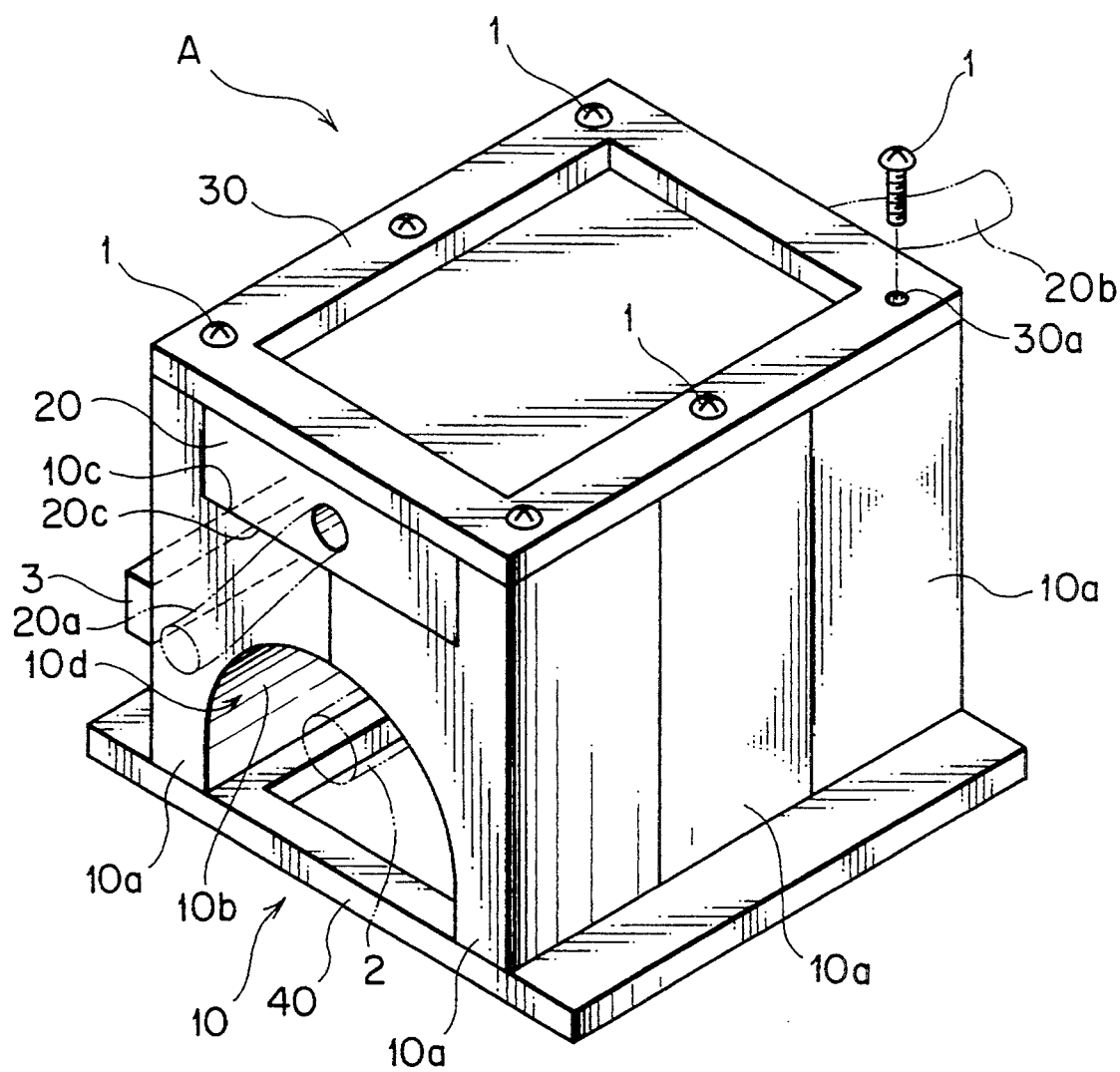
FIG. 1 is a perspective view of a cooled reflective mirror apparatus as one embodiment of the present invention.
Figure 2:
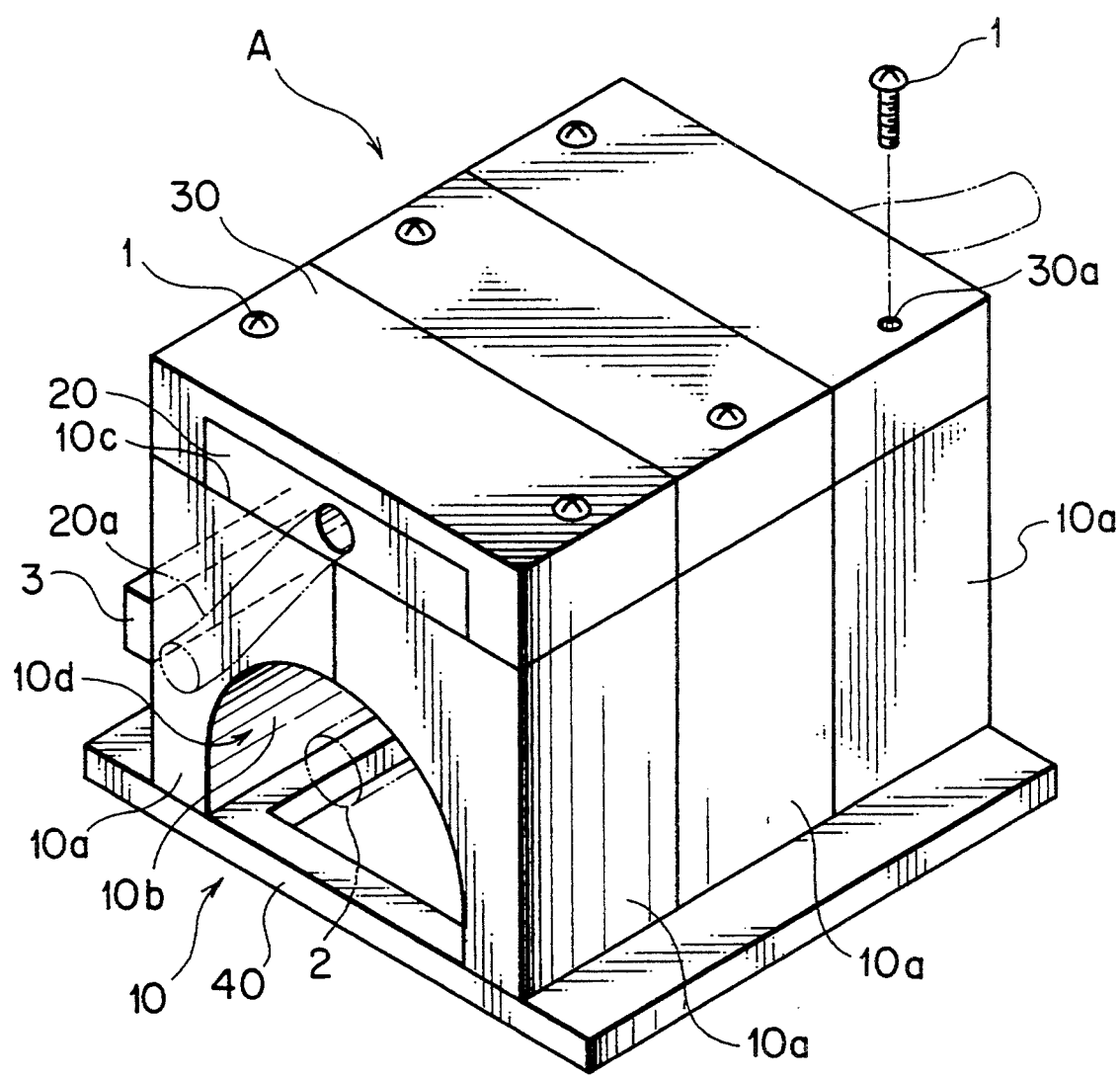
FIG. 2 is a perspective view of a cooled reflective mirror apparatus as a second embodiment of the present invention.
Figure 3:
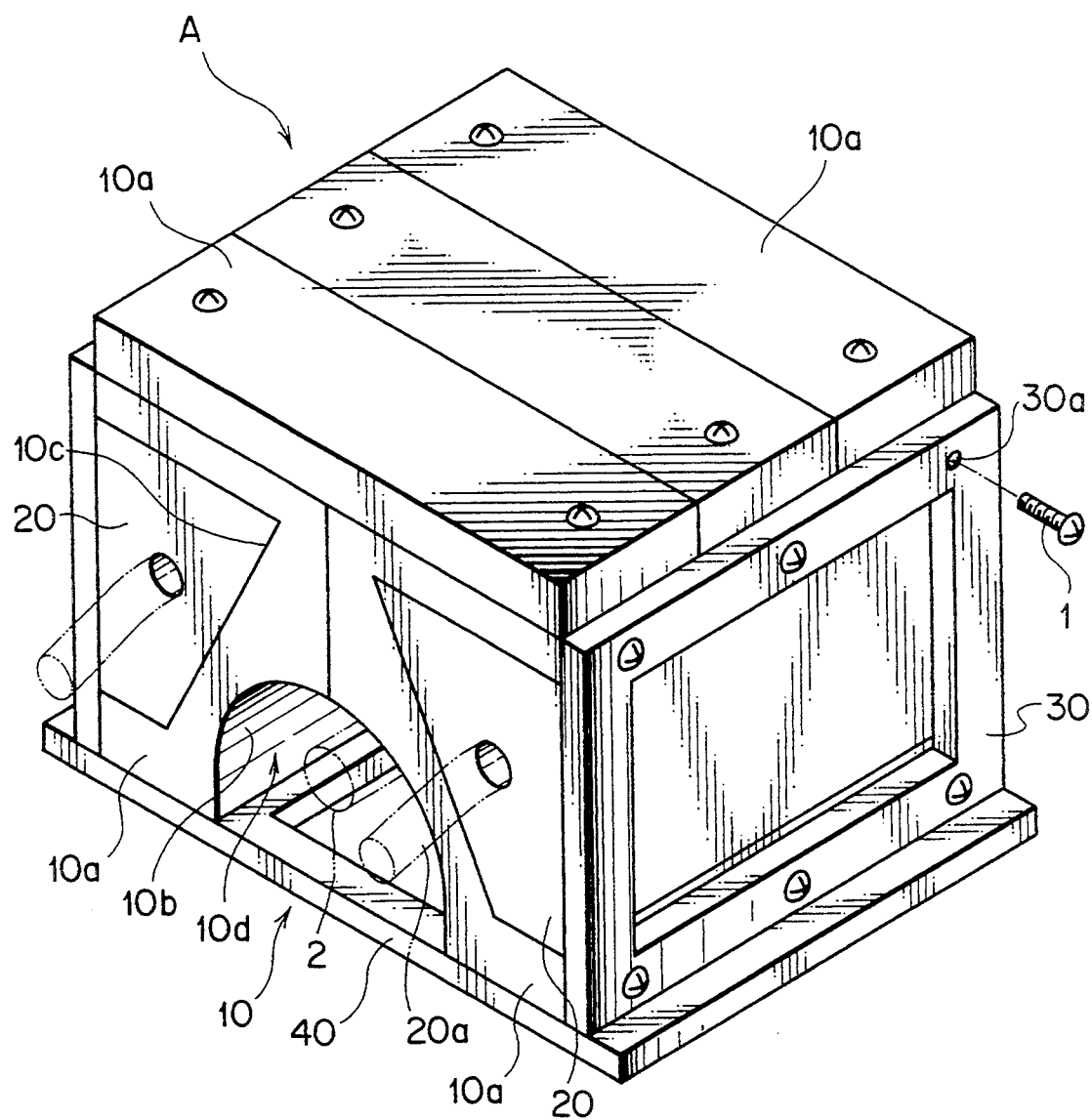
FIG. 3 is a perspective view of a cooled reflective mirror apparatus as a third embodiment of the present invention.
Figure 5:
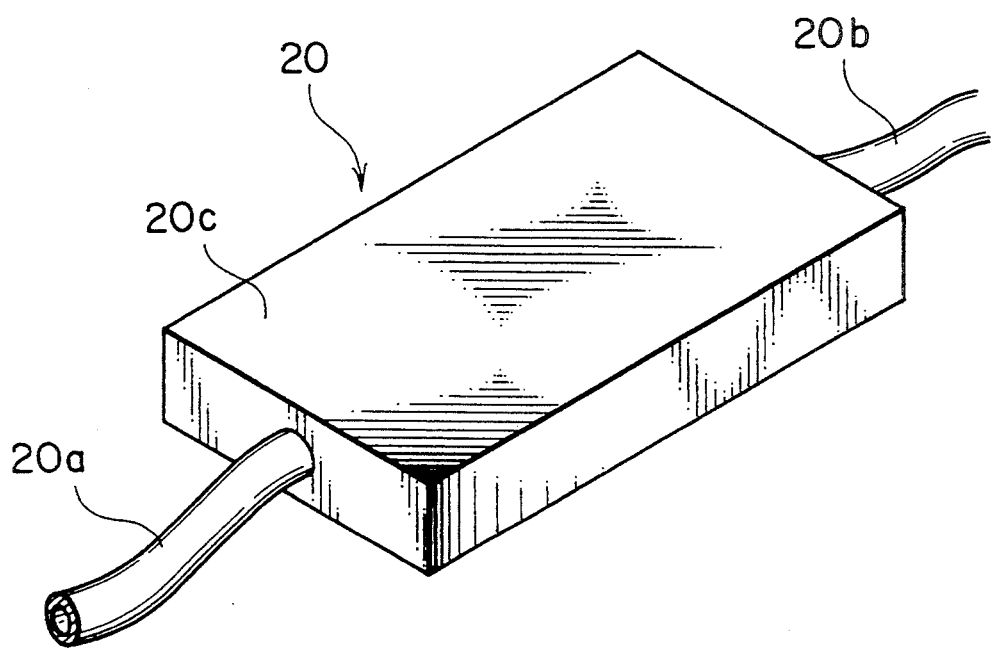
FIG. 5 is a perspective view of a cooling tank in the cooled reflective mirror apparatus of the invention.
Figure 6:
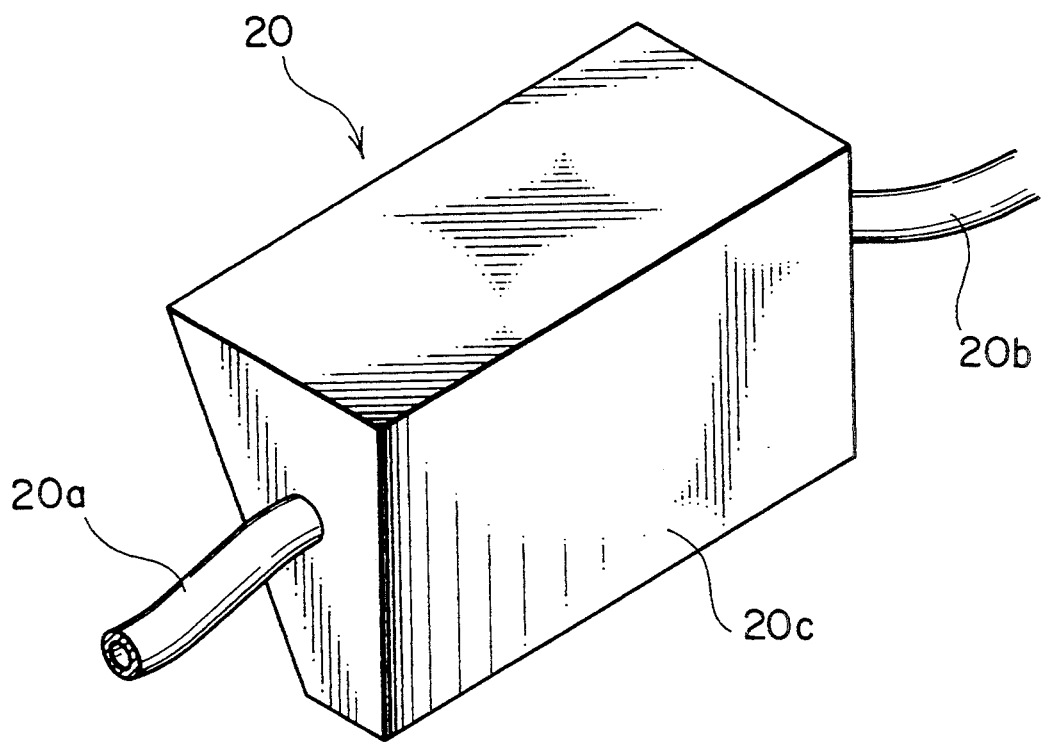
FIG. 6 is a perspective view of another example of the cooling tank in the cooled reflective mirror apparatus of the invention.

Embodiments of the cooled reflective mirror apparatus A according to the present invention will be described by referring to the accompanying drawings. FIG. 1 is a perspective view of the cooled reflective mirror apparatus A according to this invention. FIGS. 2 through 4 are perspective views of other embodiments of the cooled reflective mirror apparatus A of this invention. FIGS. 5 and 6 are perspective views of cooling tanks for the cooled reflective mirror apparatus A of this invention.

The feature of this invention is that the mirror body is divided into a plurality of constitutional blocks of a certain thickness, each of which has its inner surface formed into an arc-like curved surface and its outer flat surface in contact with a cooling tank so that the cooling area can spread over the entire outer surface of the mirror body to effectively absorb heat. Because the mirror body is thick enough to prevent the cooling liquid from being warmed over many hours of use, it is possible to provide stable cooling of the mirror body, thus preventing deterioration of the mirror due to excess heat.

The cooled reflective mirror A will be explained in further detail. A mirror body 10 of the cooled reflective mirror A consists of a plurality of blocks 10a having a certain thickness, each of which is formed with a curved surface portion 10b at the inner surface. A cooling tank 20 is placed in contact with a flat outer surface 10c of the body.

A reflective mirror surface 10d of the curved surface portion 10b is plated to reflect light. The cooling tank 20, which has a flat surface 20c in contact with the flat surface 10c of the mirror body 10, is connected at both ends with cooling liquid supply and discharge pipes 20a, 20b so that cooling liquid, which is supplied from the pipe 20a or 20b, circulates through the cooling tank to cool the reflective mirror body 10.

The blocks 10a are made of aluminum or brass or heat resisting resin materials, with the plated reflective mirror surface 10d on the curved surface portion 10b made up of a nickel plated layer to cover and smooth the rough surface of the curved surface portion 10b, a heat ray absorbing layer covering the nickel plated layer, and a reflected heat ray transmission layer that covers the heat ray absorbing layer and transmits heat rays, these layers plated in that order. (These layers are not shown.)

In the embodiment shown in FIG. 1, the curved surface portions 10b on the inner surface of the blocks 10a are formed by a drill of an automated control machine tool (not shown).

The blocks 10a are formed with flat surfaces 10c at their outer surfaces. When combined together the blocks 10a form the arc-like curved surface portion 10b and therefore the reflective mirror body 10.

The flat outer surface 10c on the top of the reflective mirror body 10 is in contact with the flat surface 20c of the cooling tank 20, which is held to the reflective mirror body 10 by a retainer member 30.

The retainer member 30 has a plurality of small holes 30a, through which screws 1 are passed and screwed into threaded holes (not shown) in the reflective mirror body 10.

A rectangular frame 40 is screwed to the bottom of the reflective mirror body 10. A light source unit 2 is installed to extend below and face the bottom of the reflective mirror body 10 so that light reflected by the mirror body 10 can pass through the frame 40.

An auxiliary member 3 is fixed to the side of the reflective mirror body 10 by screws (not shown) to further prevent the blocks 10a from coming out of alignment at the joint surfaces.

FIGS. 2 to 4 represent other embodiments of cooled reflective mirror apparatus A.

In these embodiments a plurality of blocks 10a use aluminum or brass or heat resisting resin materials, as in the first embodiment. The plated layer forming the reflective mirror surface 10d of the mirror body 10 consists of a nickel plated layer to cover and smooth the rough surface of the curved surface portion 10b, a heat ray absorbing layer covering the nickel plated layer, and a reflected heat ray transmission layer that covers the heat ray absorbing layer and transmits heat rays, these layers plated in that order. (These layers are not shown.)

The curved surface portions 10b on the inner surface of the blocks 10a are formed by a drill of an automated control machine tool (not shown). The blocks 10a are also formed with flat outer surfaces 10c at their outer surfaces. When combined together the blocks 10a form the arc-like curved surface portion 10b on the inside and therefore the reflective mirror body 10. The flat surface 10c formed on one side or both sides of the outer surface of the reflective mirror body 10 is placed in contact with the flat surface 20c of the cooling tank 20, which is held to the mirror body 10 by a retainer member 30. The retainer member 30 has a plurality of small holes 30a, through which screws 1 are passed and screwed into threaded holes (not shown) in the reflective mirror body 10.

A rectangular frame 40 is screwed to the bottom of the reflective mirror body 10. A light source unit 2 is installed to extend below and face the bottom of the reflective mirror body 10 so that light reflected by the mirror body 10 can pass through the frame 40.

An auxiliary member 3 is fixed to the side of the reflective mirror body 10 by screws (not shown) to further prevent the blocks 10a from coming out of alignment at the joint surfaces.

The retainer member 30 may be formed either as a frame member that holds only the circumference of the cooling tank 20 or as a blank plate that covers the entire cooling tank 20. The cooling tank 20, as shown in FIGS. 5 and 6, extends longitudinally of the reflective mirror body 10 and is in contact with the mirror body 10 over its entire flat surface. The cooling tank 20 may preferably be formed rectangular in horizontal cross section that matches the horizontal cross-sectional shape of the reflective mirror body 10. The vertical cross section of the cooling tank 20 may be other than rectangular. The cooling tank 20 is attached with cooling liquid supply and discharge pipes 20a, 20b at both ends. These pipes 20a, 20b are also connected at the other ends to a separate cooling device that circulates the cooling liquid at all times.

Since the cooling tank is placed in surface contact with the reflective mirror body through the matching flat surfaces of the cooling tank and the reflective mirror body, the reflective mirror body is effectively cooled for many hours of use by the cooling liquid circulating through the cooling tank. This construction not only maintains the cooling effect for long period of use but also improves production yields by its simple structure.

What is claimed is:

1. A cooled reflective mirror apparatus comprising:
   a reflective mirror body having a curved surface portion on an inner side thereof and a flat surface portion on an outer side thereof, the curved surface portion being plated to reflect light;
   a cooling tank having a flat surface portion that matches the flat surface portion of the reflective mirror body, the cooling tank being placed in tight surface contact with the reflective mirror body through the matching flat surface portions of the cooling tank and the reflective mirror body; and
   an opening opposed from said curved surface through which light reflected from said curved surface passes.

2. A cooled reflective mirror apparatus comprising:
   a reflective mirror body having a curved surface portion on an inner side thereof and a flat surface portion on an outer side thereof, the curved surface portion being plated to reflect light; and
   a cooling tank having a flat surface portion that matches the flat surface portion of the reflective mirror body, the cooling tank being placed in tight surface contact with the reflective mirror body through the matching flat surface portions of the cooling tank and the reflective mirror body,
   wherein the reflective mirror body is formed by assembling a plurality of blocks with a certain thickness.

3. A cooled reflective mirror apparatus according to claim 2, wherein said cooling tank is held to said flat surface portion of the mirror body by a retainer member.

4. A cooled reflective mirror apparatus comprising:
   a reflective mirror body having a curved surface portion on an inner side thereof and a flat surface portion on an outer side thereof, the curved surface portion being plated to reflect light; and a cooling tank having a flat surface portion that matches the flat surface portion of the reflective mirror body, the cooling tank being placed in tight surface contact with the reflective mirror body through the matching flat surface portions of the cooling tank and the reflective mirror body, wherein the cooling tank is fitted with cooling liquid supply and discharge pipes at both ends thereof through which cooling liquid is passed.

5. A cooled reflective mirror apparatus according to claim 4, wherein the cooling liquid is supplied to and discharged from the cooling tank through the cooling liquid supply and discharge pipes temporarily stays in and circulates though the cooling tank to cool the outer surface of the reflective mirror body.

* * * * *